United States Patent [19]
Hendrickson et al.

[11] Patent Number: 5,638,405
[45] Date of Patent: Jun. 10, 1997

[54] DUAL-MODE BASEBAND CONTROLLER FOR RADIO-FREQUENCY INTERFACES RELATING TO DIGITAL CORDLESS TELEPHONES

[75] Inventors: Alan F. Hendrickson; Joseph W. Peterson, both of Austin, Tex.

[73] Assignee: AMD, Sunnyvale, Calif.

[21] Appl. No.: 192,046

[22] Filed: Feb. 4, 1994

[51] Int. Cl.$^6$ .................................. H04L 27/04
[52] U.S. Cl. .................... 375/298; 375/261; 375/267; 375/299
[58] Field of Search ................... 375/295, 261, 375/220, 260, 264, 267, 288, 298, 299; 341/68, 69, 141; 455/101, 102, 15

[56] References Cited

U.S. PATENT DOCUMENTS

| | | | |
|---|---|---|---|
| 3,931,472 | 1/1976 | Gill et al. | 179/156 A |
| 4,606,053 | 8/1986 | Schröder | 375/87 |
| 4,745,628 | 5/1988 | McDavid et al. | 375/39 |
| 4,757,519 | 7/1988 | Collison et al. | 375/60 |
| 5,031,192 | 7/1991 | Clark | 375/200 |
| 5,090,026 | 2/1992 | Stern et al. | 375/47 |
| 5,377,226 | 12/1994 | Davis | 375/1 |
| 5,418,818 | 5/1995 | Marchetto et al. | 375/264 |
| 5,446,757 | 8/1995 | Chang | 375/239 |

OTHER PUBLICATIONS

Schultes et al, Frequenz, vol. 46 No. 11 pp. 280–284, "Comparison of GMSK Modulators for DECT-Cordless Telephones".

*Primary Examiner*—Edward L. Coles, Sr.
*Assistant Examiner*—Madeleine Au Nguyen
*Attorney, Agent, or Firm*—H. Dale Langley, Jr.

[57] ABSTRACT

A dual-mode baseband controller enables a single integrated circuit to support either In-Phase Quadrature (I-Q) or Non-Return to Zero (NRZ) radio-frequency transmitter architectures for use in second generation (CT2) cordless telephones. A radio frequency (RF) interface circuit controls output signals to support either the I-Q architecture or the NRZ architecture, depending on a MODE control bit received from a controlling integrated circuit. The RF interface circuit comprises an I-Q waveform generator, four multiplexers, two digital-to-analog converters, a buffer, interconnecting circuitry, and a timing controller operating under configurable software control.

12 Claims, 6 Drawing Sheets

| ENABLE 38 | DATA 37 | TX+ 21 | TX- 22 |
|---|---|---|---|
| 0 | X | TXREF | TXREF |
| 1 | 0 | TXREF - 0.5V | TXREF + 0.5V |
| 1 | 1 | TXREF + 0.5V | TXREF - 0.5V |
Fig. 2
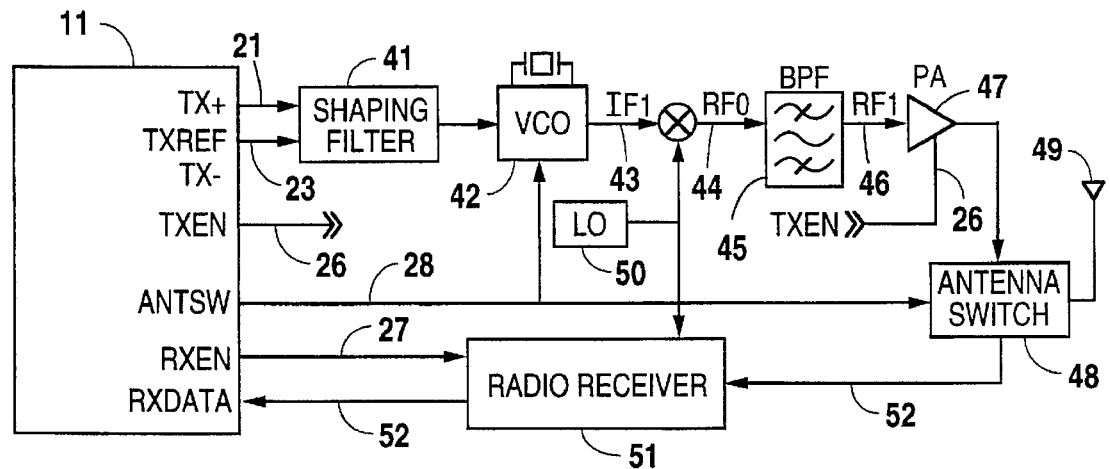
Fig. 3
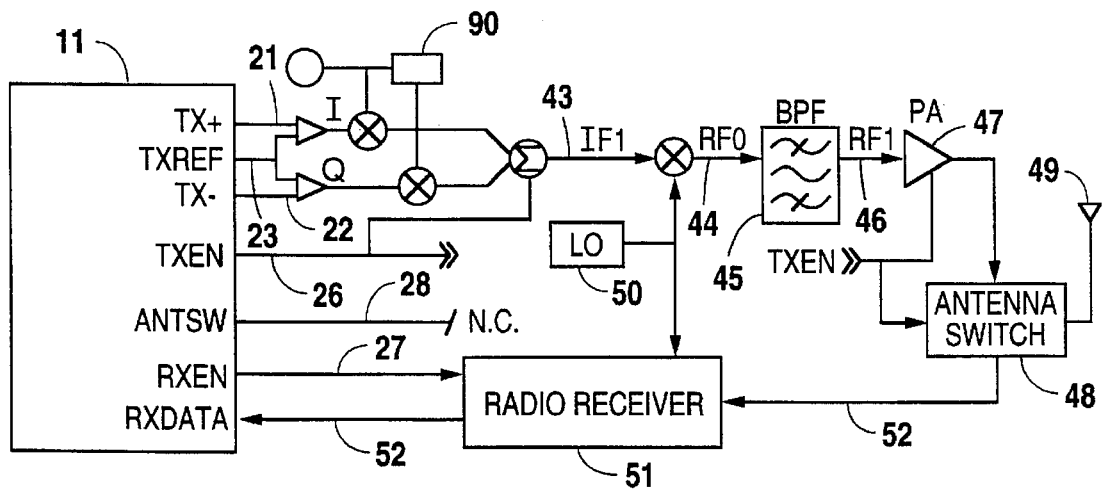
Fig. 4

| PIN | DEFAULT FUNCTION | NEW OPTIONAL FUNCTION |
|---|---|---|
| 83<br>85<br>84<br>76 | I/O INTERFACE:<br>  TXI: ANALOG OUTPUT<br>  TXQ: ANALOG OUTPUT<br>  MREF: ANALOG REFERENCE<br>  XINT2: INTERRUPT INPUT | NRZ INTERFACE:<br>  TXDATA: NRZ OUTPUT<br>  !TXDATA: NRZ OUTPUT<br>  MREF: ANALOG REFERENCE<br>  ANTSW: ANTENNA SWITCH |
| 27 | GENERAL PURPOSE:<br>  P1.6 (I/O) | SPECIAL FUNCTION:<br>  SYNCI/O : 500Hz I/O |
| 97 | BASESTATION:<br>  ROW [1] | HANDSET:<br>  MAIN BATTERY LEVEL INPUT |
| 25 | KEYPAD/GENERAL OUT:<br>  COL6_OUT7 | EXTERNAL OSCILLATOR<br>  OSCILLATOR ENABLE<br>  (SHUTDOWN INDICATOR) |
| 35 | LATCHED ADDRESS:<br>  ALE I/O, CLK4M OUT | ALTERNATE:<br>  ALE OUT |
| 63 | A[7]   (LATCHED ADDRESS) | CLK4M OUT |
| 62 | A[6]   (LATCHED ADDRESS) | RESERVED |
| 61-58 | A[5:2] (LATCHED ADDRESS) | LINEAR DSP PORT (4PINS) |
| 57 | A[1]   (LATCHED ADDRESS) | RESERVED |
| 56 | A[0]   (LATCHED ADDRESS) | MODE SELECT |

Fig. 6

DUAL-MODE BASEBAND CONTROLLER FOR RADIO-FREQUENCY INTERFACES RELATING TO DIGITAL CORDLESS TELEPHONES

CROSS-REFERENCE TO RELATED APPLICATIONS

This application is related to the following U.S. patent applications:

| SER. NO. | TITLE | INVENTOR(S) |
| --- | --- | --- |
| 07/917,497 | General I/O Port Interrupt Mechanism | Gulick, et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,627 | Integrated Circuit and Cordless Telephone Using the Integrated Circuit | Gulick, et al. |
| 07/918,626 | Modulator Test System | Peterson, et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Circuit | Gulick, et al. |
| 07/918,622 | Clock Generator Capable of Shut-down Mode and Clock Generation Method | Peterson, et al. |
| 07/918,621 | Signal Averager | Gulick |
| 08/192,007 | Power Management Circuit for Use in Digital Cordless Telephones and Like Apparatus | Hendrickson, et al. |
| 08/191,949 | Apparatus and Method for Sending Signal Data | Schizlein, et al. |
| 08/191,940 | Burst Synchronization of Time Division Multiplexed Transceiver Pairs | Schnizlein |
| 08/191,994 | Receiver Quality Measurement System for Use in Digital Cordless Telephones and Like Apparatus | Hendrickson, et al. |
| 08/192,057 | Method and Apparatus for External Intermediate Data Processing | Mullins, et al. |
| 08/192,009 | Metal Programmed Transistor Array | Allee |
| 08/191,948 | Input/Output Data Port and Method | Mullins, et al. |
| 08/191,818 | Method and Apparatus for Improved Link Establishment and Monitoring in a Communications System | Hendrickson |

All of the related applications are assigned to the assignee of the present invention and are hereby incorporated herein in their entirety by this reference thereto.

BACKGROUND OF THE INVENTION

1. Field of the Invention

This invention relates to integrated circuits (ICs) for controlling the functions of a cordless telephone and, more particularly, to an IC with a dual-mode baseband controller for radio-frequency (RF) interfaces.

2. History Of the Technology

The Radio Equipment and Systems (RES) Technical Committee of the European Telecommunications Standards Institute (ETSI) has developed an Interim European Telecommunication Standard (I-ETS). This standard, I-ETS 300 131R1, dated 3 Feb. 1993, Fifth Draft, is titled "Radio Equipment and Systems (RES); Common air interface specification to be used for the interworking between cordless telephone apparatus in the frequency band 864.1 MHz to 868.1 MHz, including public access services," and is hereby incorporated by reference herein.

The I-ETS 300 131 R1 specification covers the minimum performance requirements for fixed and portable radio units used with the second generation cordless telephone (CT2), common air interface service (CAI), operating in the band 864.100 MHz to 868.100 MHz.

CT2 cordless telephones use a time division duplex 32-kbit/sec Adaptive Differential Pulse Code Modulation (ADPCM) voice (B) channel and a 1-, 2-, or 16-kbit/sec control (D) channel between the handset and the base station. The physical implementation is a 72-kbit/sec ping-pong type radio link with identical transmit and receive frequencies. In countries where the frequency band is available, the channel center frequencies for the forty (40) CT2 channels are 864.050 MHz+(0.100×n) MHz, where n is the channel number lying in the range 1 to 40, inclusive. The first channel (channel no. 1) lies at 864.150 MHz and the last channel (channel no. 40) lies at 868.050 MHz.

The channel frequency accuracy required of both the base and handset of the cordless telephone is ±10 kHz, maximum difference between the nominal and actual channel center frequencies over specified supply voltage and temperature ranges. Automatic frequency control (AFC) may be used in the receiver at both the base and the handset, but may only be linked to control the transmitter center frequency at the handset. The maximum rate of change of the transmit center frequency at both the base and the handset cannot exceed 1 kHz/ms, except for the specific cases of switching of the handset transmitter from Signaling Multiplex Mode 3 (MUX3) to Signaling Multiplex Mode 2 (MUX2) and for channel changing.

There are two popular radio frequency transmitter architectures utilized in CT2 digital cordless telephones to meet these transmitter signal specifications. The first is In-Phase/Quadrature (I-Q), and the second is Non-Return to Zero (NRZ). Each of these radio frequency transmitter architectures has distinct advantages and disadvantages as discussed below.

The I-Q architecture generally allows tighter spectral control and reduces the number of tuning devices needed in the radio transmitter. In the manufacturing process, a greater number of tuning devices generally equates to higher labor costs. Therefore, utilization of the I-Q architecture, which reduces the number of tuning devices, reduces labor costs relative to the NRZ architecture. Disadvantages of the I-Q architecture include relatively high costs of radio components utilized in the I-Q architecture, and relatively high power consumption characteristics.

The NRZ architecture utilizes standard superheterodyning techniques, taking advantage of components which have been cost-reduced due to enormous commercial radio industry production volumes. Heterodyne reception is the process of reception in which a received high frequency wave is combined in a non-linear device with a locally generated wave. The process normally occurs in a frequency converter in which the signal input frequency is changed by superimposing a local oscillation to produce an output having the same modulation information as the original signal, but at a frequency which is either the sum or the difference of the signal and local oscillator frequencies. In super-heterodyne reception, the process of heterodyne reception is used to convert the voltage of the received wave into a voltage of an intermediate, but usually super-audible frequency, that is then detected.

The disadvantages of the NRZ architecture are that the spectral characteristics are relatively poor when compared to the I-Q architecture, and the NRZ architecture requires relatively more tuning devices, thereby increasing production labor costs.

In the past, integrated circuits (ICs) for controlling the functions of cordless telephones have included the capability to support either the I-Q architecture or the NRZ architecture, but not both. The controlling ICs have TX+ and TX- pins, and the two RF transmitter architectures require different waveforms at the TX+ and TX- pins, as well as different timing at various control pins of the IC. It would be a distinct advantage to have an IC capable of supporting either the I-Q architecture or the NRZ architecture, whichever is chosen by the ultimate customer. This would allow overall production costs to be reduced through volume production of one design rather than two. It also offers the ultimate customer an easy migration path from the lower performance NRZ architecture to the higher performance I-Q architecture. The present invention provides a radio frequency (RF) interface circuit which enables a single IC to support either the I-Q or the NRZ radio frequency transmitter architecture.

SUMMARY OF THE INVENTION

In one aspect, the present invention is a dual-mode radio frequency (RF) baseband controller comprising means for controlling an In-Phase Quadrature (I-Q) RF transmitter architecture, means for controlling a Non-Return to Zero (NRZ) RF transmitter architecture, and means for selecting between the means for controlling the I-Q RF transmitter architecture and the means for controlling the NRZ RF transmitter architecture.

In another aspect, the present invention is a radio frequency (RF) interface circuit for enabling an integrated circuit (IC) to selectively control a plurality of RF transmitter architectures requiring different waveforms and timing at various control pins of the IC. The RF interface circuit may comprise means for controlling an In-Phase Quadrature (I-Q) RF transmitter architecture, means for controlling a Non-Return to Zero (NRZ) RF transmitter architecture, and means for selecting between the means for controlling the I-Q RF transmitter architecture and the means for controlling the NRZ RF transmitter architecture.

In yet another aspect, the present invention is a method of selectively controlling a plurality of radio frequency (RF) transmitter architectures from a single integrated circuit (IC) having transmitter signal pins and timing control pins. The method includes selectively generating different waveforms within the IC, delivering those selectively generated waveforms to the transmitter signal pins of the IC, selectively controlling timing signals within the IC, and delivering those selectively controlled timing signals to the control pins of the IC.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2 is a table which describes a Non-Return to Zero (NRZ) waveform which is generated under various combinations of an ENABLE signal and a DATA signal in the preferred embodiment of the present invention;

FIG. 3 is a high level block diagram illustrating a configuration in which the RF interface circuit of the present invention is used in conjunction with the NRZ transmitter architecture;

FIG. 4 is a high level schematic and block diagram illustrating a configuration in which the RF interface circuit of the present invention is used in conjunction with the In-Phase Quadrature (I-Q) transmitter architecture;

FIG. 6 is a table illustrating Am79C410A-Am79C410 Pinout/Backward Compatibility in the preferred embodiment of the present invention.

DETAILED DESCRIPTION

Figure 1:
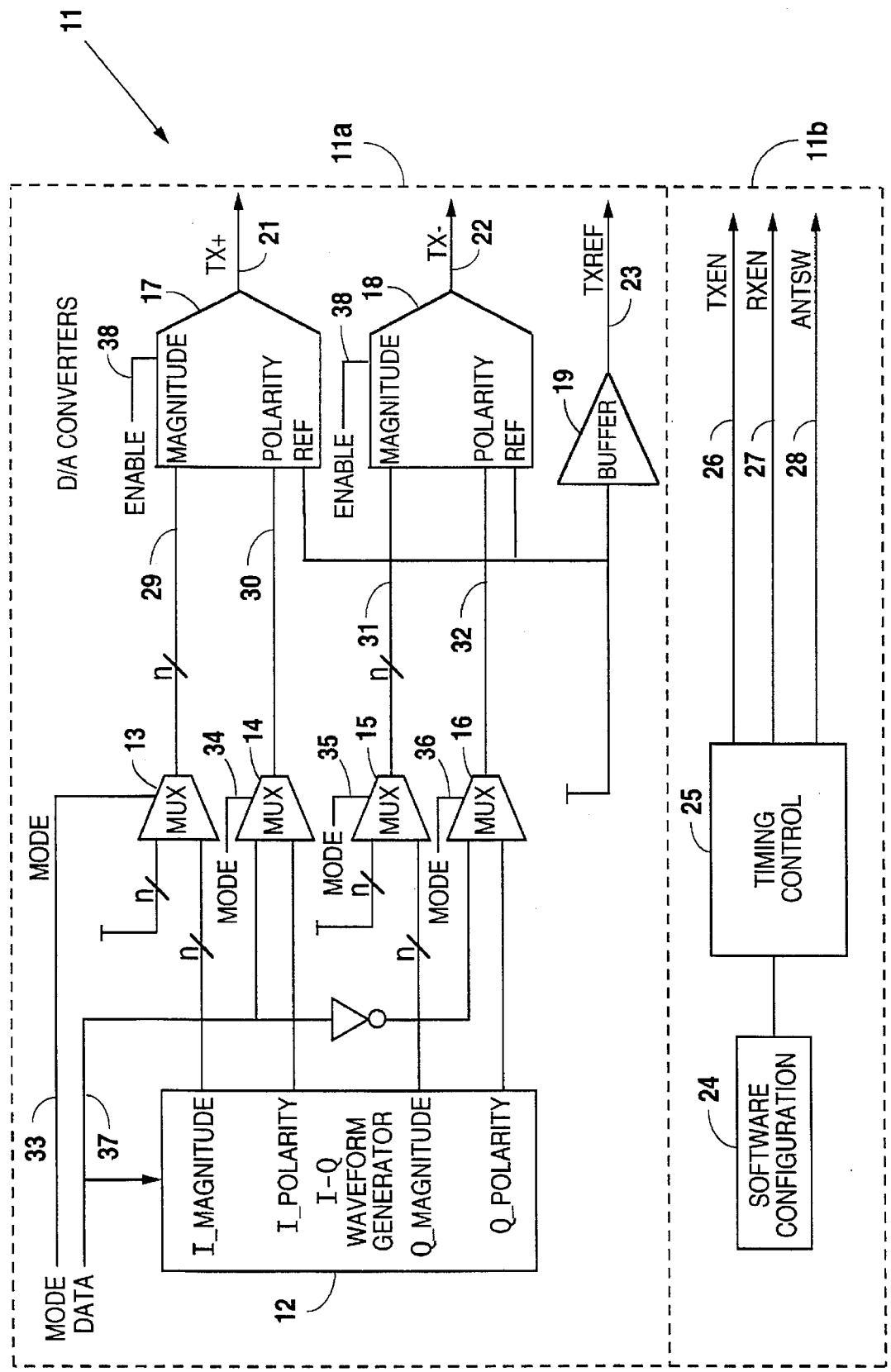
FIG. 1 is a high level block diagram of a radio frequency (RF) interface circuit in the preferred embodiment of the present invention.

The preferred embodiment of the present invention is an improved radio frequency (RF) interface circuit which is part of an integrated circuit (IC) controlling many of the handset functions of a second generation (CT2) cordless telephone. The invention may be used with either the In-Phase Quadrature (I-Q) RF transmitter architecture or the Non-Return to Zero (NRZ) RF transmitter architecture. FIG. 1 is a high level block diagram of the RF interface circuit 11 in the preferred embodiment of the present invention. The RF interface circuit 11 comprises a modulator portion 11a and a CT2 formatter portion 11b. The modulator portion 11a comprises an I-Q waveform generator 12, four multiplexers (MUXs) 13–16, two digital-to-analog (D/A) converters 17 and 18, a buffer 19, and interconnecting circuitry. The CT2 formatter portion 11b comprises a programmable software configuration 24 and a timing controller 25.

The output of the modulator portion 11a of the RF interface circuit 11 comprises a Transmit+signal (TX+) 21, a Transmit-signal (TX-) 22, and a Transmit Reference signal (TXREF) 23. The output of the CT2 formatter portion 11b comprises a RF Transmit Enable signal (TXEN) 26, a RF Receive Enable signal (RXEN) 27, and an Antenna Switch signal (ANTSW) 28.

The D/A converter 17 outputs the TX+ signal 21, and D/A converter 18 outputs the TX- signal 22. The TXREF signal 23 is output by buffer 19. A programmable software configuration 24 and timing controller 25 produce the signals TXEN 26, RXEN 27, and ANTSW 28.

Input signals 29–32 to the D/A converters 17 and 18 are selected by the MUXs 13–16 based upon a MODE control data bit which is supplied to the MUXs at 33–36. Based upon the MODE control data bit 33–36, the inputs 29–32 are either I-Q waveforms generated by the I-Q waveform generator 12, or square waves of full-scale magnitude with polarity at any time defined by the polarity of a DATA bit 37. An ENABLE signal 38 is applied to D/A converters 17 and 18.

FIG. 2 is a table which describes an NRZ waveform which is generated under various combinations of the ENABLE signal 38 and the DATA signal 37. In cordless telephone systems, transmission is intermittent. Therefore, as shown in FIG. 2, when the ENABLE signal 38 is disabled, i.e., zero (0), the NRZ waveform outputs TX+ 21 and TX- 22 are forced to the value TXREF.

FIG. 3 is a high level block diagram illustrating a configuration in which the RF interface circuit 11 of the present invention is used in conjunction with the NRZ transmitter architecture. Signals TX+ 21 and TXREF 23 are passed through a shaping filter 41 to a voltage controlled oscillator (VCO) 42. The TX+ 21 and TXREF 23 outputs carry a three-level square-wave type signal which is externally shaped to achieve the desired spectral content. The VCO 42 produces a frequency IF1 43 which is responsive to the signal level presented from the shaping filter 41. The spectral image at IF1 43 is then up-converted to radio frequency RF0 44 by multiplying IF1 43 by a signal generated by local oscillator 50. RF0 44 is filtered through a band pass filter (BPF) 45 to produce an image at RF1 46. RF1 46 is then amplified through the power amplifier (PA) 47 upon receipt of the transmit enable (TXEN) signal 26. The signal passes to the antenna switch 48, which is enabled by the ANTSW signal 28, and is thereafter transmitted through the antenna 49.

The antenna switch 48 is a duplex switch which isolates the radio receiver 51 from the transmitter power amplifier 47, both of which operate at the same frequency, alternating in time. The control signals RF Transmit Enable (TXEN) 26 and RF Receive Enable (RXEN) 27 enable the transmitter 47 and the receiver 51 respectively. The timing for the controls TXEN 26 and RXEN 27, when utilized in the NRZ transmitter architecture, differ from those used in the I-Q transmitter architecture. Additionally, the control signal ANTSW 28 is required for the NRZ architecture but is not used for the I-Q architecture.

FIG. 4 is a high level schematic and block diagram of a configuration in which the RF interface circuit 11 of the present invention is used in conjunction with the I-Q RF transmitter architecture. In the I-Q architecture, the TX+ signal 21 and the TX- signal 22 drive analog waveforms which are DC-referenced to TXREF 23. These analog waveforms represent the in-phase (I) and quadrature (Q) components of a modulating signal. When appropriately mixed with an intermediate frequency (IF) they produce an up-converted image at frequency IF1 43. The image at IF1 is up-converted to radio frequency RF0 44, by multiplying IF1 43 by a signal generated by local oscillator 50. RF0 44 is then filtered through a band pass filter (BPF) 45 to produce an image at RF1 46, and is then amplified through power amplifier 47 upon receipt of the transmit enable (TXEN) signal 26. The signal passes to the antenna switch 48, which is enabled by the TXEN signal 26, and transmitted through the antenna 49. Upon signal receipt, the antenna switch 48 isolates the power amplifier and the received signal 52 passes to the radio receiver 51 and to the RF interface circuit 11.

Referring again to FIG. 3, the VCO 42 responds to positive excursions of TX+ 21 above TXREF by increasing the VCO's output frequency IF1 43. The VCO 42 responds to negative excursions of TX+ 21 below TXREF by lowering its output frequency. Therefore, the input is essentially an AC waveform with a DC bias of TXREF. When the AC component of the input is zero (i.e., TX+=TXREF), then the VCO output IF1 43 is called the center frequency. Thus, as shown in FIG. 2, the ENABLE signal 38 causes the VCO 42 to settle to its center frequency when the transmission is off (i.e., ENABLE =0). Once transmission recommences, it does so from the center frequency, rather than from one of the extremes, for best response.

The amplitude of the TX+ signal 21 and the TX- 23 is fixed at 0.5V. This amplitude is internally regulated on the IC, so that as battery levels dwindle, the signal amplitudes do not vary, since this would cause the VCO 42 to produce undesirable frequencies.

The integrated circuit also drives the output of both the I and the Q polarities. Either can be used, depending on the implementation of the VCO 42. In fact, the two polarities can be used differentially in order to increase the amplitude affecting the VCO 42 and therefore the noise margin.

The signals TXEN 26, RXEN 27, and ANTSW 28 are programmable for either the NRZ or the I-Q transmitter architectures. This programmability is essential when used in conjunction with the dual-mode data transmitter of the present invention to enable use of the NRZ format.

Figure 5A:
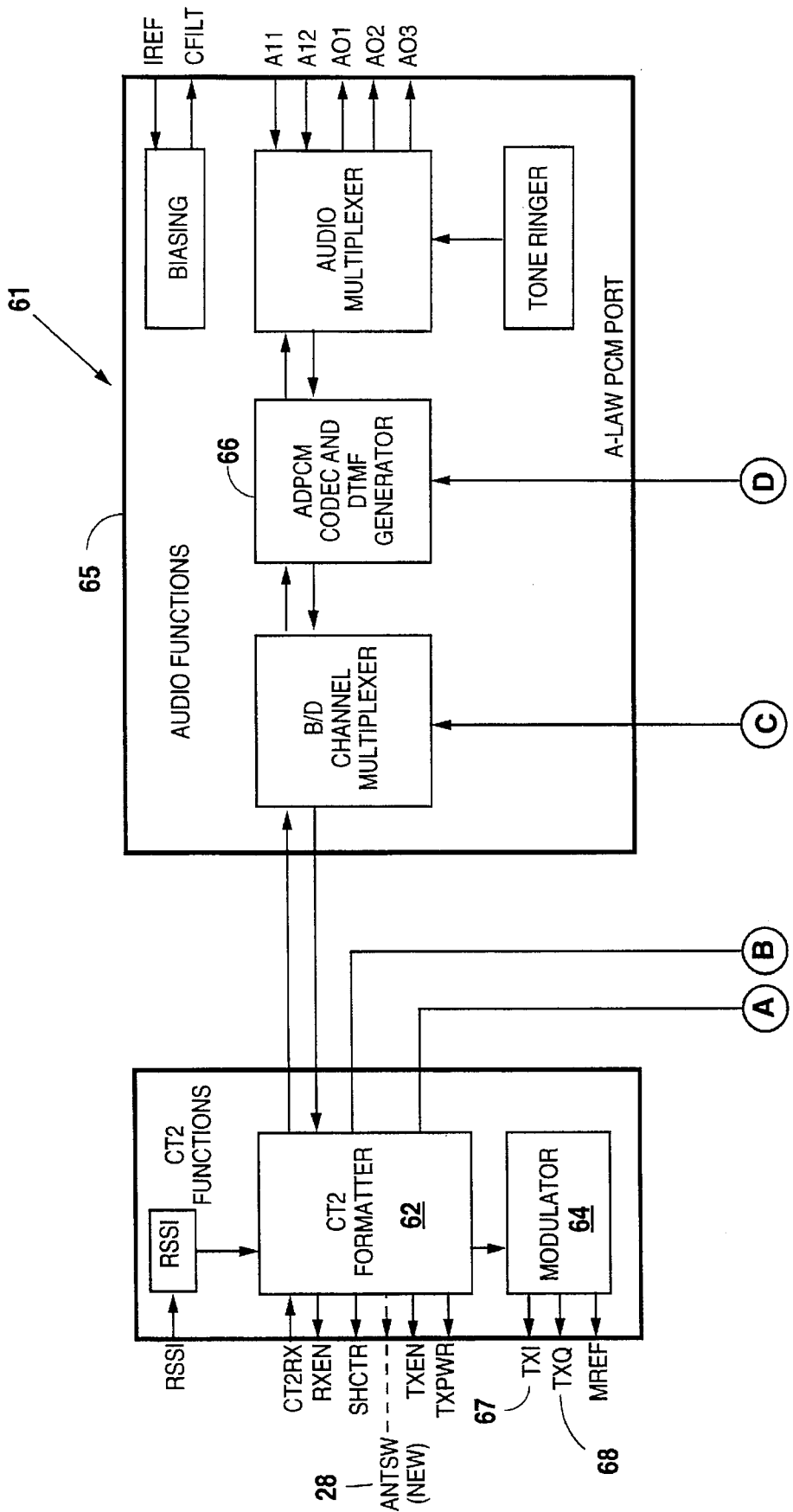
FIG. 5 is a functional block diagram of an Am79C410 integrated control circuit.
Figure 5B:
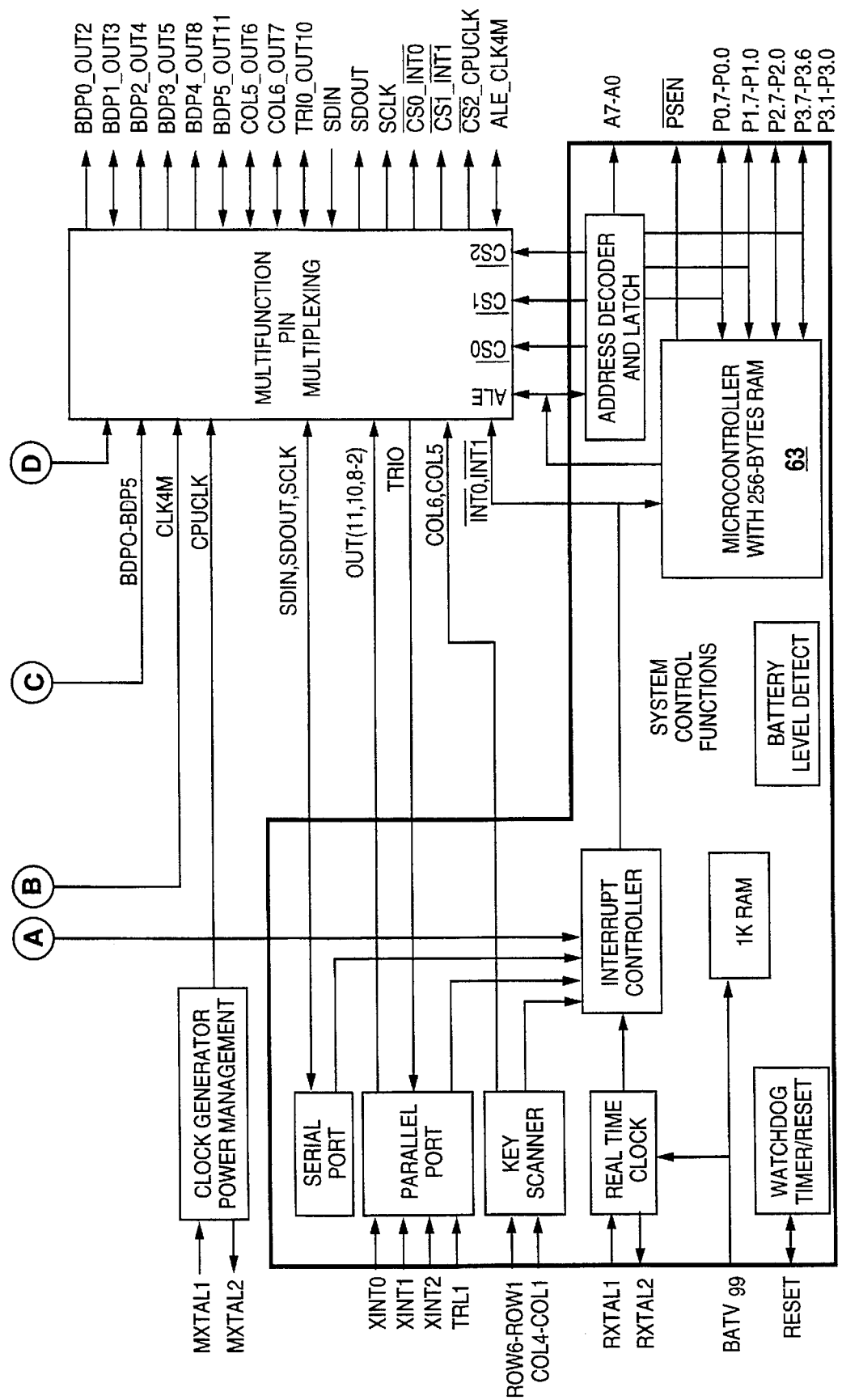

The RF interface control circuit 11 of the present invention may be implemented, for example, on an Am79C410 integrated control circuit, available from Advanced Micro Devices. FIG. 5 is a functional block diagram of the Am79C410 controller 61. The Am79C410 incorporates all of the baseband functions required by CT2 cordless telephones in a single chip, including audio processing, protocol control, data formatting, and peripheral functions such as serial port, a real time clock, and a keypad scanner. The Am79C410 integrated circuit is disclosed in detail in copending, commonly assigned applications Ser. No.'s: 07/917,503; 07/917,497; 07/917,489; 07/917,488; 07/918,632; 07/918,631; 07/918,627; 07/918,626; 07/918,625; 07/918,624; 07/918,622; and 07/918,621, each filed on Jul. 21, 1992, which disclosure is hereby incorporated by reference herein.

A CT2 formatter 62 performs all of the CT2 protocol requirements as well as baseband transmission and reception under control of an on-chip 8051-class microcontroller, which may be, for example, an 80C32T2 microcontroller 63. The controller 61 performs CT2 Layer 3 and partial Layer 2 functions, and drives the hardware which performs partial Layer 2 and Layer 1 functions. Baseband transmit data is filtered on-chip in a GMSK modulator 64 to provide Gaussian Minimum Shift Key (GMSK) output meeting CT2 spectral requirements. GMSK is a form of frequency shift keying modulation which minimizes bandwidth by conditioning the pulse shapes of individually transmitted data bits.

The audio section 65 of the Am79C410 controller 61 includes an Adaptive Differential Pulse Code Modulation (ADPCM) coder/decoder (codec) 66. The ADPCM codec 66 processes the CT2 voice (B) channel as a 32-kbit/sec ADPCM stream. The Am79C410 converts analog voice input at the microphone interface to ADPCM format and converts ADPCM received data to analog output at the earpiece or loudspeaker output.

The Am79C410A is an improved version of the Am79C410 controller 61 which incorporates the present invention as well as the inventions disclosed in the co-pending and simultaneously filed applications referenced in this application. FIG. 6 is a table illustrating Am79C410A—Am79C410 Pinout/Backward Compatibility relating to the implementation of the present invention. All new functions are multiplexed on the identified pins under software or hardware configuration controls. The table is separated in columns by mutually exclusive functions. For backward compatibility, all new features must be enabled by software.

For implementation of the NRZ transmitter architecture, a new mode is added to the Am79C410 controller 61 so that transmit data bypasses the GMSK modulator 64 and appears as a ±0.5V square wave biased around TXREF at the TXI pin 67 and TXQ pin 68. When no data is being transmitted, the output from the IC is TXREF.

A single programmable software control bit (i.e., the MODE control bit 33) is an input to the TX modulator D/A converter 17 for selecting the I-Q or NRZ format. As NRZ outputs, TXI is positive with respect to digital data and TXQ is negative. A new register is defined as follows:

| Mnemonic: | MODTEST |
|---|---|
| Bit 4 | NRZ! /I-Q. NRZ or I-Q Format Selection control for the TXI and TXQ pins<br>0:=I-Q<br>1:=NRZ. |

Figure 7:
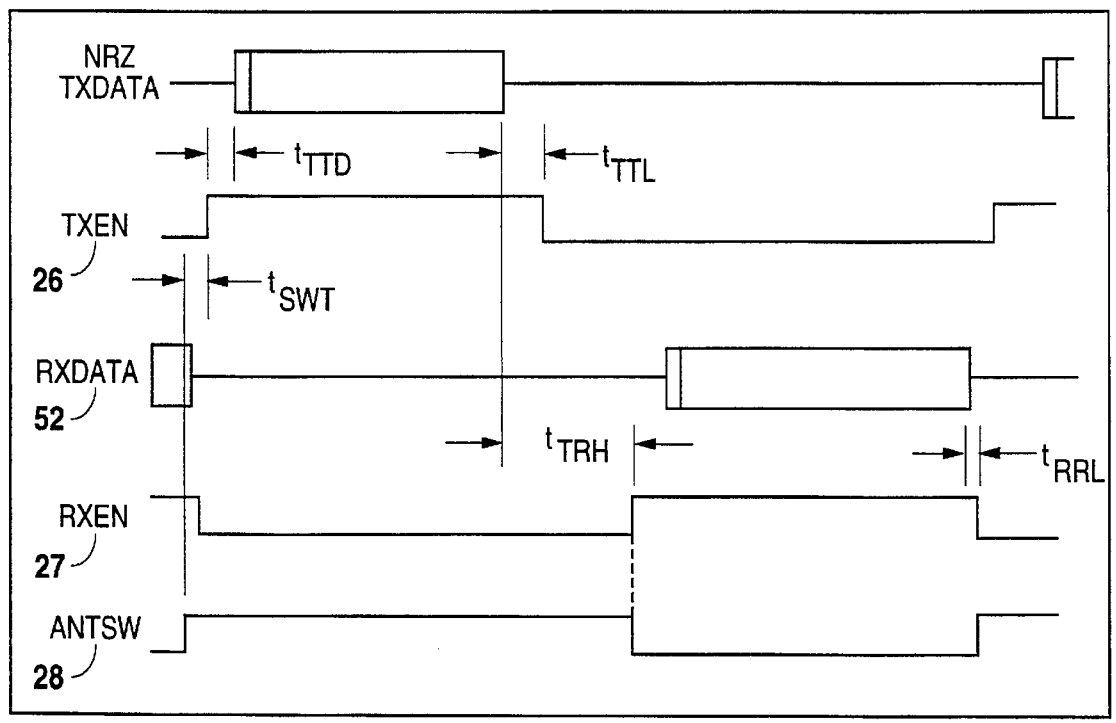
FIG. 7 is a timing diagram illustrating the timing relationships between the various RF interface control signals which are under the control of the timing control block of FIG. 1.

FIG. 7 is a timing diagram illustrating the relationships between the various RF interface control signals which are under the control of the timing control block 25 of FIG. 1. From the baseline configuration of the AM79C410, programmability is added to TXEN signal 26 and the RXEN signal 27 such that the IC can fulfill timing requirements for the various RF implementations. In FIG. 7, NRZTXDATA is digital transmit data. I/Q filtered transmit data output (not shown) lags NRZ output by approximately 15.5 microseconds (μsec). For TXEN 26, the rising edge of TXEN 26 with respect to unfiltered digital transmit data is 868 nanoseconds $\leq t_{TTD} \leq 32.1$ μsec in 3.47 μsec increments. The programmability range of the falling edge of TXEN 26 with respect to transmit data is 4.3 μsec $\leq t_{TTL} \leq 46$ μsec in 3.47 μsec increments.

With respect to RXEN 27, the programmable delay from the end of digital transmit data to RXEN high is 11.3 μsec $\leq t_{TRH} \leq 87.6$ μsec, with 3.47 μsec resolution. RXEN 27 always falls $t_{RRL}$=6.9 μsec after the last data bit is received. RXEN 27 can also be forced high regardless of the activity state of the CT2 formatter 62 to enable the radio receiver for low power scanning activity.

The Antenna Switch Signal (ANTSW) 28 is a new output control added to the baseline AM79C410 integrated circuit. The function of ANTSW 28 is to switch the antenna 49 between the receive and transmit functions. ANTSW 28 always goes high $t_{SWT}$=6.9 μsec before TXEN 26 rises and goes low when RXEN 27 goes high. ANTSW 28 is multiplexed on the XINT2 pin and is enabled for the ANTSW function under software control.

A new register is defined for the purpose of TXEN RF timing control. The description of this new register is as follows:
Mnemonic: TDELAY (new register)
Description: TXEN RF Timing Control
Address: FFD4
Default: 8BH
Access: R/W
Bits 7:4 Programmed delay $t_{TTD}$. 868 nsec $\leq t_{TTD} \leq 32.1$ μsec in 3.47 μsec increments. Default =4.3 μsec. Unspecified codes are not valid.

| Bits [7:4] | Delay | Bits [7:4] | Delay |
|---|---|---|---|
| 0 0 0 0 | 32.1 μsec | 0 1 0 1 | 14.8 μsec |
| 0 0 0 1 | 28.6 μsec | 0 1 1 0 | 11.3 μsec |
| 0 0 1 0 | 25.2 μsec | 0 1 1 1 | 7.8 μsec |
| 0 0 1 1 | 21.7 μsec | 1 0 0 0 | 4.3 μsec |
| 0 1 0 0 | 18.2 μsec | 1 0 0 1 | 0.87 μsec |

Bits 3:0 Programmed delay $t_{TTL}$. 4.3 μsec $\leq t_{TTL} \leq 46$ μsec in 3.47 μsec increments. Default =42.5 μsec. Unspecified codes are not valid.

| Bits [3:0] | Delay | Bits [3:0] | Delay |
|---|---|---|---|
| 0 0 0 0 | 4.3 μsec | 0 1 1 1 | 28.6 μsec |
| 0 0 0 1 | 7.8 μsec | 1 0 0 0 | 32.1 μsec |
| 0 0 1 0 | 11.3 μsec | 1 0 0 1 | 35.6 μsec |
| 0 0 1 1 | 14.8 μsec | 1 0 1 0 | 39.0 μsec |
| 0 1 0 0 | 18.2 μsec | 1 0 1 1 | 42.5 μsec |
| 0 1 0 1 | 21.7 μsec | 1 1 0 0 | 46.0 μsec |
| 0 1 1 0 | 25.2 μsec | | |

Additionally, a new register is defined for receiver RF timing control. This new register is defined as follows:

| Mnemonic: | RDELAY (new register) |
|---|---|
| Description: | Receiver RF Timing Delay |
| Address: | FFD5 |
| Default: | OBH |
| Access: | R/W |
| Bit 7 | Reserved |
| Bit 6 | XINT2/ANTSW Select<br>0:=XINT2 pin performs XINT2 (external interrupt 2) input function.<br>1:=XINT2 pin performs ANTSW (antenna switch) output function. |
| Bit 5 | Force RXEN pin high, regardless of activity state of the CT2 Formatter. This feature allows receive level scanning without activating the CT2 Formatter.<br>0:=default operation of RXEN<br>1:=Force RXEN high. |
| Bits 4:0 | Programmed delay $t_{TRH}$. 11.3 μsec $\leq t_{TRH} \leq 87.6$ μsec 3.47 μsec increments. Default = 49.5 μsec. Unspecified codes are not valid. |

| Bits [4:0] | Delay | Bits [4:0] | Delay |
|---|---|---|---|
| 0 0 0 0 0 | 11.3 μsec | 0 1 1 0 0 | 52.9 μsec |
| 0 0 0 0 1 | 14.8 μsec | 0 1 1 0 1 | 56.4 μsec |
| 0 0 0 1 0 | 18.2 μsec | 0 1 1 1 0 | 59.9 μsec |
| 0 0 0 1 1 | 21.7 μsec | 0 1 1 1 1 | 63.4 μsec |
| 0 0 1 0 0 | 25.2 μsec | 1 0 0 0 0 | 66.8 μsec |
| 0 0 1 0 1 | 28.6 μsec | 1 0 0 0 1 | 70.3 μsec |
| 0 0 1 1 0 | 32.1 μsec | 1 0 0 1 0 | 73.8 μsec |
| 0 0 1 1 1 | 35.6 μsec | 1 0 0 1 1 | 77.2 μsec |
| 0 1 0 0 0 | 39.0 μsec | 1 0 1 0 0 | 80.7 μsec |
| 0 1 0 0 1 | 42.5 μsec | 1 0 1 0 1 | 84.2 μsec |
| 0 1 0 1 0 | 46.0 μsec | 1 0 1 1 0 | 87.6 μsec |
| 0 1 0 1 1 | 49.5 μsec | | |

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A dual-mode radio frequency (RF) baseband controller for selectively controlling an In-Phase Quadrature (I-Q) or a Non-Return to Zero (NRZ) RF transmitter architecture, said controller comprising:

means for receiving a first data signal;

an I-Q waveform generator for generating a second data signal from said first digital data signal;

means for selecting between controlling said NRZ RF transmitter architecture and said I-Q RF transmitter architecture by selectively driving either the first data signal or the second data signal, respectively; wherein said second data signal includes I-magnitude, I-polarity, Q-magnitude, and Q-polarity.

2. The dual-mode baseband controller of claim 1 wherein said first data signal comprises square waves of full-scale magnitude with polarity at any time defined by a single bit.

3. The dual-mode baseband controller of claim 2 wherein said means for selecting includes:

means for receiving a MODE control data bit;

means for inverting said first data signal;

a first multiplexer which receive the I-magnitude and the first data signal;

a second multiplexer which receives the I-polarity and a predetermined NRZ magnitude signal;

a third multiplexer which receives the Q-magnitude and the first data signal, inverted;

a fourth multiplexer which receives the Q-polarity and the predetermined NRZ magnitude signal;

means for supplying said MODE control data bit to each of said multiplexers; and means for driving a positive transmit signal and a negative transmit signal by receiving signals from said multiplexers.

4. The dual-mode baseband controller of claim 3 further comprising a timing controller which generates programmable signals RF Transmit Enable (TXEN), RF Receive Enable (RXEN), and Antenna Switch (ANTSW).

5. A radio frequency (RF) interface circuit for enabling an integrated circuit (IC) to selectively control a plurality of RF transmitter architectures requiring different waveforms and timing at various control pins of said IC, said RF interface circuit comprising:

means for controlling an In-Phase Quadrature (I-Q) RF transmitter architecture including an I-Q waveform generator, said waveform generator generating signals for I-magnitude, I-polarity, Q-magnitude, and Q-polarity;

means for controlling a Non-Return to Zero (NRZ) RF transmitter architecture including means for generating square waves of full-scale magnitude with polarity at any time defined by a DATA signal comprising a single bit; and means for selecting between said means for controlling said I-Q RF transmitter architecture and said means for controlling said NRZ RF transmitter architecture to produce a first transmit signal and a second transmit signal.

6. The radio frequency (RF) interface circuit of claim 5 wherein said means for selecting between said means for controlling said I-Q RF transmitter architecture and said means for controlling said NRZ RF transmitter architecture includes:

means for generating a MODE control data bit;

a plurality of multiplexers, each of which receives a different one of said signals generated by said waveform generator; and means for supplying said MODE control data bit to each of said multiplexers.

7. The radio frequency (RF) interface circuit of claim 6 further comprising a timing controller which generates programmable signals RF Transmit Enable (TXEN), RF Receive Enable (RXEN), and Antenna Switch (ANTSW).

8. A method of selectively controlling a plurality of radio frequency (RF) transmitter architectures from a single integrated circuit (IC) having transmitter signal pins and timing control pins, said method comprising the steps of:

generating different waveforms within said IC, wherein one of said waveforms has more bits than another of said waveforms;

multiplexing said waveforms;

selectively delivering said multiplexed waveforms to said transmitter signal pins of said IC;

selectively controlling timing signals within said IC; and delivering said selectively controlled timing signals to said control pins of said IC.

9. The method of selectively controlling a plurality of radio frequency (RF) transmitter architectures of claim 8 wherein said step of generating different waveforms within said IC includes the step of generating a waveform of four data signals for use with an In-Phase Quadrature (I-Q) RF transmitter architecture.

10. The method of selectively controlling a plurality of radio frequency (RF) transmitter architectures of claim 9 wherein said step of selectively controlling timing signals within said IC includes the step of providing timing signals for use with an In-Phase Quadrature (I-Q) RF transmitter architecture.

11. The method of selectively controlling a plurality of radio frequency (RF) transmitter architectures of claim 9 wherein said step of generating different waveforms within said IC includes the step of generating a waveform of one data signal for use with a Non-Return to Zero (NRZ) RF transmitter architecture.

12. The method of selectively controlling a plurality of radio frequency (RF) transmitter architectures of claim 11 wherein said step of selectively controlling timing signals within said IC includes the step of providing timing signals for use with a Non-Return to Zero (NRZ) RF transmitter architecture.

* * * * *